W. S. HUTCHINSON.
VISIBLE LIQUID MEASURE.
APPLICATION FILED APR. 27, 1917.
1,280,481.
Patented Oct. 1, 1918.
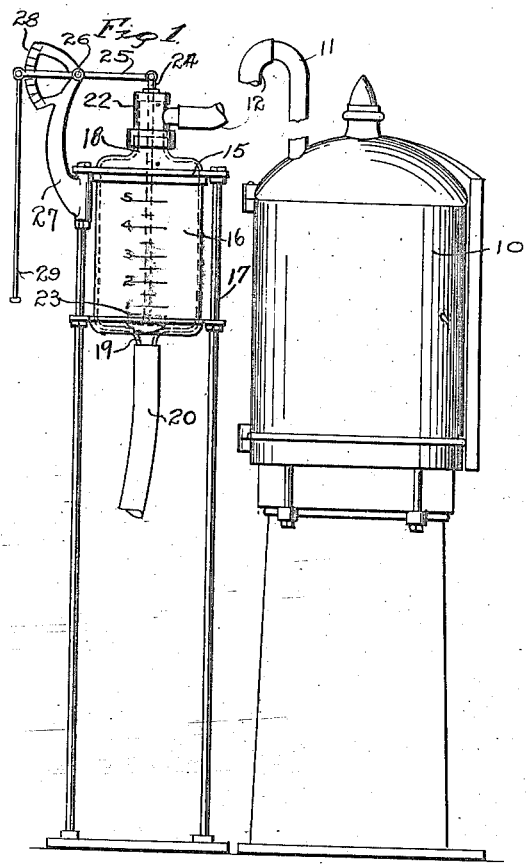
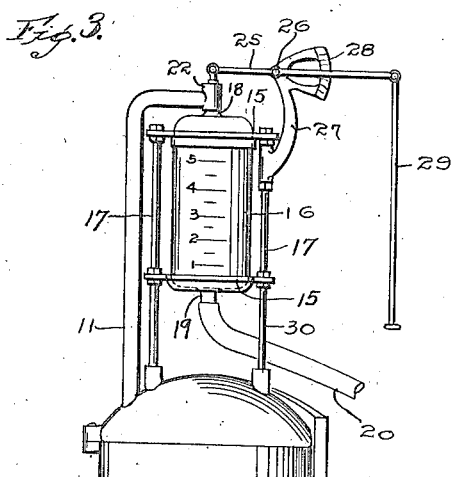
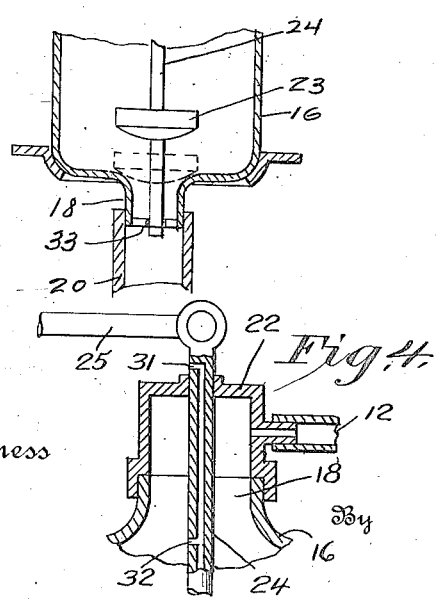
Inventor
WARNER S. HUTCHINSON.

UNITED STATES PATENT OFFICE.

WARNER S. HUTCHINSON, OF TERRE HAUTE, INDIANA.

VISIBLE LIQUID-MEASURE.

1,280,481.  Specification of Letters Patent.  Patented Oct. 1, 1918.

Application filed April 27, 1917. Serial No. 164,901.

*To all whom it may concern:*

Be it known that I, WARNER S. HUTCHINSON, a citizen of the United States, and a resident of Terre Haute, county of Vigo, and State of Indiana, have invented a certain new and useful Visible Liquid-Measure; and I do hereby declare that the following is a full, clear, and exact description thereof, reference being had to the accompanying drawings, in which like letters refer to like parts.

The object of this invention is to provide practical means for enabling purchasers of gasolene or the like to clearly see, visibly before them, the measurement or quantity of gasolene which they are buying.

In the usual gasolene pumping station for charging automobiles with gasolene, the purchaser can not tell how much gasolene he is buying. It is pumped into the gasolene tank on the automobile without being visibly measured so that the purchaser cannot see and know exactly how much gasolene he has bought.

The purpose of this invention is to visibly vend gasolene although the invention is not necessarily limited to gasolene pumping stations.

The chief feature of this invention consists in a jar or receptacle made of transparent material into which the gasolene or other fluid, whatever it may be, is introduced. Said receptacle is graduated to indicate gallons or other units of liquid measurement. An outlet for the discharge of the liquid is provided, leading from the bottom of the jar or receptacle. A valve closes this lower discharge outlet and means for externally operating it is provided for opening said valve. Therefore, in operation the valve at the bottom of the measuring receptacle is closed and the amount of liquid desired is introduced into the measuring receptacle, and then the valve at the lower end thereof is opened for its discharge.

The full nature of the invention will be understood from the accompanying drawings and the following description and claims:

Figure 1 is an elevation of a gasolene pump and the measuring device located adjacent thereto and connected therewith by a tube partially broken away. Fig. 2 is a central vertical section through the measuring receptacle. Fig. 3 is an elevation of a modified form wherein the measuring receptacle and associated parts are combined mechanically with the pump structure so as to make one permanent device. Fig. 4 is an enlarged detail sectional view of the upper end of the receptacle and the cap fitting thereon.

There is shown herein a gasolene pump 10 of the familiar and common type as used at this time for charging the gasolene tanks of automobiles with gasolene. The gasolene is pumped up through the pipe or conduit 11 and discharged heretofore through a rubber or flexible tube 12.

In the form shown in Fig. 1 there is located adjacent said gasolene pump a frame 15 in which is mounted a glass measuring tank or receptacle 16 suitably graduated for indicating gallons. This glass tank is preferably mounted in said frame by the removable bars 17 whereby it can be removed and replaced.

The glass jar or measuring receptacle has an inlet opening 18 at its upper end and an outlet opening 19 at its lower end. From the outlet opening a flexible tube 20 leads, through which the contents of the measuring receptacle 16 is discharged into the tank of the automobile or other vessel.

On the upper end of the glass measuring receptacle there is a metal cap 22 which is connected with the tube 12 whereby the gasolene from the pump 10 is introduced into the measuring receptacle 16. This construction, however, may be modified in any way so as to provide some means for discharging the gasolene from the tube 12 into the glass measuring receptacle.

The outlet opening 19 is adapted to be controlled and closed by a valve 23 which is secured to a tube 24 which extends up through the glass jar and the cap 22 through the guide 33 and is pivotally connected to a lever 25, which is fulcrumed between its ends at 26 on an arm 27 which is secured to the frame of the device. The tube 24 is provided with a port 31 above the tank and a port 32 within the tank for permitting air to enter therein. On said arm 27 there is a segmenal rack 28 against which said lever 25 flexibly bears so that it will hold said lever in any adjusted position, and also operates the valve for controlling the discharge outlet.

In the modified form shown in Fig. 3 the gasolene receptacle is combined with the pump to make a unitary structure. There are rods 30 extending up from the top of the pump to which the measuring receptacle 16 is secured by the bars 17. The pipe 11 is rigid and connects directly with the cap 22. Otherwise the construction is unchanged.

In operation the valve 23 is first closed and then the pump operated until say five gallons of gasolene has been introduced into the measuring receptacle 16. Then the pump is stopped and the rod 29 drawn downward so as to open the valve 23 and allow the five gallons of gasolene with which the glass tank 16 has been charged to pass through the tube 20 into the tank on the automobile or other receptacle.

By this means the purchaser will always know that he is getting the quantity of fluid or liquid which he intended to obtain, and that he is not being cheated. It is immaterial whether the discharge opening 19 is centrally located in the bottom of the measuring receptacle 16 or elsewhere in the bottom of such receptacle. It is also immaterial how the fluid or liquid is introduced into the upper end of the jar 16. It is necessary, however, to have some valve construction whereby the discharge outlet will be closed while the jar is being filled, whereby the discharge outlet can be opened for discharging the contents of the jar at leisure.

The invention claimed is:

1. A measuring receptacle formed of transparent material and provided with an inlet opening at its upper end and a discharge opening at its lower end, a frame for supporting said receptacle, a graduation on said receptacle for indicating the contents thereof, a valve for closing the discharge opening, a tubular rod secured to said valve and extending upward through the inlet opening of said receptacle, means to admit air into said receptacle through said rod, an arm on said frame, a lever pivoted to said arm and pivoted at one end to said rod, and a segmental rack for holding said operating means in adjusted position.

2. A measuring device comprising a transparent receptacle having an inlet opening at its upper end and a discharge opening at its lower end, a frame supporting said receptacle, a valve for closing the discharge opening, a hollow rod secured to said valve and extending upwardly through the inlet opening of the receptacle, said hollow rod having a port at a point above the receptacle, and an additional port at a point within the receptacle for admitting air into the upper portion of the receptacle, an arm on said frame, a lever pivoted at one end to said hollow rod and between its ends to said arm, a pull rod attached to the free end of said lever, and a rack for holding said lever in adjusted position.

In witness whereof, I have hereunto affixed my signature.

WARNER S. HUTCHINSON.